United States Patent [19]

Langford

[11] 4,079,950
[45] Mar. 21, 1978

[54] SELF-ADJUSTING CABLE ROD SEAL

[75] Inventor: William D. Langford, Stow, Ohio

[73] Assignee: Incom International Inc., Pittsburgh, Pa.

[21] Appl. No.: 788,338

[22] Filed: Apr. 18, 1977

[51] Int. Cl.² .................... F16J 15/32; F16C 1/28
[52] U.S. Cl. .................... 277/152; 277/165; 277/189; 277/207 R; 74/502; 403/366; 403/372
[58] Field of Search ............... 74/501 R, 501.5, 502; 403/366, 372; 277/138, 149, 151, 152, 31, 117, 157, 165, 84, 166, 186, 189, 207 R, 207 A

[56] References Cited

U.S. PATENT DOCUMENTS

| | | | |
|---|---|---|---|
| 2,529,486 | 11/1950 | Clarkson et al. | 74/501 X |
| 2,751,793 | 6/1956 | Sandberg | 74/502 |
| 2,850,915 | 9/1958 | Bratz | 74/501 |
| 3,426,613 | 2/1969 | Conrad | 403/372 X |
| 3,740,083 | 6/1973 | Zenhausern | 403/372 X |
| 3,752,008 | 8/1973 | Danek | 74/501 R |
| 3,857,589 | 12/1974 | Oostenbrink | 277/DIG. 2 X |

FOREIGN PATENT DOCUMENTS

| | | | |
|---|---|---|---|
| 1,011,617 | 4/1952 | France | 74/501 |
| 1,226,907 | 2/1960 | France | 277/117 |
| 595,030 | 6/1959 | Italy | 74/501 |
| 905,487 | 9/1962 | United Kingdom | 74/501 |

Primary Examiner—Robert S. Ward, Jr.
Attorney, Agent, or Firm—James C. Wray

[57] ABSTRACT

A self-adjusting wear resistant seal assembly is provided for a cable rod slidably positioned within a cable conduit. A continuous polyethylene collar is radially compressed in close clearance around the rod by an elastomeric seal which embraces the end portion of the conduit and the collar and holds a flange on the collar against the end portion of the conduit. An integral lip on the seal engages the rod to provide a redundant seal. Corresponding serrations on the conduit and seal cooperate to secure the seal to the rod. A tapered lip may also be provided on the collar for engagement with the rod.

21 Claims, 4 Drawing Figures

U.S. Patent   March 21, 1978   4,079,950
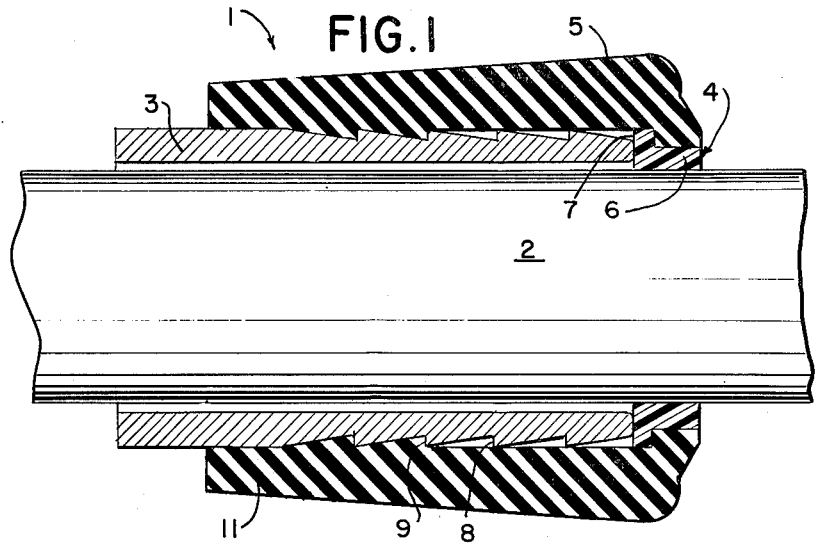
FIG. 1
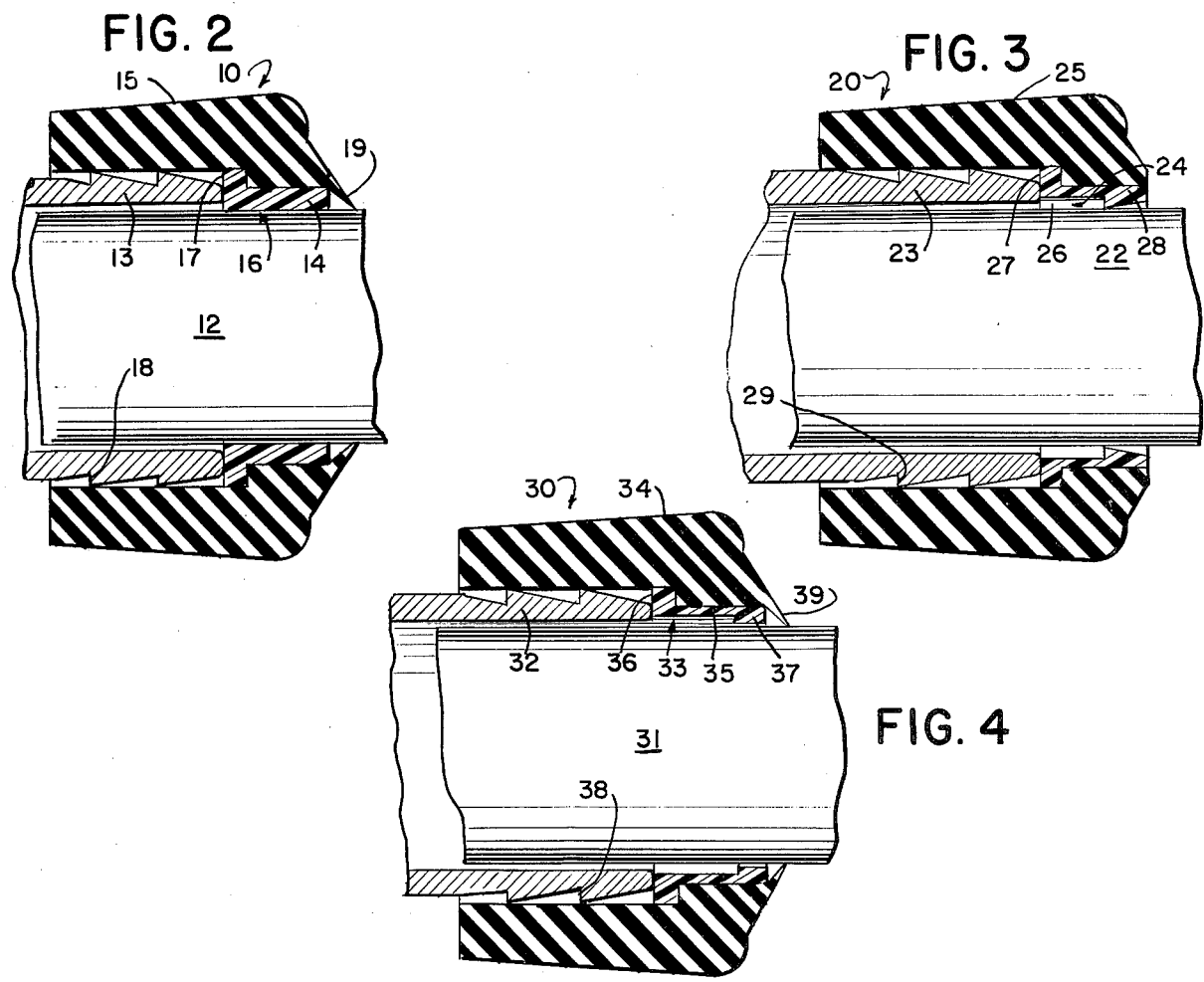
FIG. 2
FIG. 3
FIG. 4

SELF-ADJUSTING CABLE ROD SEAL

BACKGROUND OF THE INVENTION

This invention relates generally to cable rod seals, more particularly having reference to a self-adjusting wear-resistant cable rod seal comprising a polyethylene insert compressed in close clearance around the sliding rod by an elastomeric seal which fits over the insert.

DESCRIPTION OF THE PRIOR ART

Pertinent United States and foreign patents are found in Class 74, subclasses 469, 490, 491, 501R, 501T, 502, 503 and 504, and in Class 277, subclasses 328, 152, 165, 180, 188, 212R, 212C, 212F, 212FB and 227 of the official classifications of patents in the U.S. Patent and Trademark Office.

Examples of pertinent patents are U.S. Pat. Nos.: 2,062,186, 3,380,318, 3,469,854, 3,663,024, 2,958,993, 3,139,867, 3,450,412, 3,594,012, 3,856,314, 3,942,806, 3,980,309.

U.S. Pat. No. 2,859,993 shows a collar with a long axial portion and a flange which abuts the housing or conduit for the rod, in this case a valve stem, which is held in place by an elastomeric cup-shaped cover. The cast iron collar is split so that it tightly hugs the stem, and it may be that the resilient member squeezes the collar to grip the stem.

The elastomeric cup also has a lip portion which extends beyond the dollar to grip the shaft and thus to form a redundant seal. The elements are not made of the same material as the elements of the present invention, and the inner member does not have the same structural shape as the inner member of the seal of the present invention.

U.S. Pat. No. 3,380,318 has a sealing washer and an end cup. Apparently the sealing washer and the cup are made of plastic, particularly polyethylene, but no self-adjusting feature or redundant seal is described.

The remaining patents show relatively rigid inner members and softer outer members, but none of the disclosures have features which anticipate the present invention. Many problems remain in the prior art devices. One problem lies in the rapid deterioration of sealing assemblies caused by frictional contact between the sliding rod and the soft resilient materials required to perform the sealing function. Another problem lies in the inability to compensate for wear of the sealing assembly, thereby necessarily resulting in inadequate sealing performance.

SUMMARY OF THE INVENTION

The present invention overcomes many of the problems which exist in the prior art devices. The seal assembly of the present invention has a polyethylene insert with a close clearance around the sliding rod. An elastomeric seal fits over the polyethylene insert and compresses the insert toward the rod, tending to maintain the sealing condition of the insert and overcoming a tendency of the polyethylene to underload.

In a preferred embodiment, the polyethylene seal has a long axial portion terminating inwardly in a radially extended flange and terminating outwardly in a small inward projecting lip. The flange portion is held up against the rod conduit by the elastomeric portion, and the elastomeric portion radially inwardly compresses the axial portion of the polyethylene insert. An outward extending lip on the elastomeric portion touches the sliding rod and forms a redundant seal.

OBJECTS OF THE INVENTION

Objects of the invention are, therefore, to provide an improved cable rod seal which is highly wear resistant and which automatically compensates for any wear that does occur. Another object of the invention is to provide a self adjusting cable rod seal adapted to be mounted on a cable conduit, having a cable rod slidably positioned therein, comprising a bearing collar having a long axial portion disposed in close clearance around the rod and terminating inwardly in a radially extending flange, and a resilient seal having an end wall overlying said flange and axially restrained to hold the flange against the end portion of the conduit, said wall having an axial bore radially compressing the axial portion of the collar disposed therein toward the rod.

Still another object of the invention is the provision of a resilient seal which embraces the end portion of the conduit.

A further object of the invention is to provide a bearing collar whose axial portion is continuously disposed in close clearance around the rod. Yet another object of the invention is to provide a seal formed of an elastomeric material and to provide a collar formed of a thermoplastic polymeric material.

Another object of the invention is to provide an annular lip on the resilient seal which extends outwardly at an angle beyond the collar and terminates in touching relationship with the rod. Still another object of the invention is the provision of a resilient seal with a side wall having serrations adapted to cooperate with corresponding serrations on the end portion of the conduit for securing the seal to the conduit. A further object of the invention is to provide a bearing collar having a long axial portion terminating axially inwardly in a radially outwardly extending flange and terminating axially outwardly in a relatively small radially inwardly projecting lip disposed in close clearance around the rod. Yet another object of the invention is to provide a lip on the collar which is radially internally tapered, with its axially outward end of larger diameter than its axially inward end.

These and other and further objects and features of the invention are apparent in the disclosure which includes the above and below specifications and claims and drawings.

BRIEF DESCRIPTION OF THE DRAWINGS

FIG. 1 is an enlarged sectional view of the seal assembly of the present invention shown mounted on a cable rod and conduit.

FIG. 2 is an enlarged sectional view of the seal assembly of the present invention mounted on a cable rod and conduit and having a redundant seal feature.

FIG. 3 is an enlarged sectional view of another embodiment of the seal of the present invention mounted on a cable rod and conduit.

FIG. 4 is an enlarged sectional view of another embodiment of the seal of the present invention mounted on a cable rod and conduit and having redundant seal features.

DETAILED DESCRIPTION OF THE DRAWINGS

Referring to FIG. 1, a self-adjusting cable rod seal assembly 1, embodying the features of the present invention is shown mounted on a cable rod 2 and conduit 3. The rod 2 is the relatively long rigid member which is customarily crimped to the end of a flexible cable and used to communicate axial actuating forces to the cable. The rod 2 is slidably mounted in a rigid tubular conduit 3 which is customarily connected to the end of a flexible cable guide.

The seal assembly 1 generally comprises a bearing collar member 4 and a seal member 5. The collar 4 has a relatively long axial portion 6 disposed in close clearance around the rod 2. The axial portion 6 terminates in a radially extending flange 7 which is held against the end of the conduit 3 by the seal member 5.

The collar 4 is formed of a highly wear-resistant material having a relatively low elastic memory. The seal 5, on the other hand, is formed of a relatively soft material, having a high degree of elastic memory. As a result, the seal 5 continuously exerts a radially inwardly compressing force on the axial portion 6 of the collar 4. The collar 4, which is continuous annularly around the rod 2, is thereby held in close contact with the rod 2 at all points around the circumference of the rod 2. This tight seal between the rod 2 and collar 4 effectively prevents entry of destructive material into the conduit 3 but at the same time permits the rod 2 to slide freely in the conduit 3. Should friction between the collar 4 and the sliding rod 2 cause any wear of the collar 4, the compressive force exerted by the seal 5 on the collar 4 will effectively compensate for the wear and hold the axial portion 6 of the collar 4 in close contact against the rod 2.

Preferably the collar 4 is formed of the thermoplastic polymeric material. In particular, polyethylene has been found to work exceptionally well due to its highly wear resistant characteristics. Any tendency of a polyethylene collar to creep under load is adequately compensated by the compressive forces exerted by the seal 5 on the collar 4. Preferably the seal member 5 is formed of a soft elastomeric material. Such material possesses the high elastic memory required to effectively perform the sealing and self-adjusting functions described above. Since no portion of the seal 5 comes in contact with the sliding rod 2, there is no possibility of the rod 2 causing excessive wear of a seal member 5 formed of a soft elastomeric material. The use of a polyethylene collar 4 and soft elastomeric seal 5 in the combination of the present invention preserves the excellent sealing and self-adjusting properties of elastomeric seal members but eliminates the tendency of such members to wear excessively by interposing a wear-resistant polyethylene collar between the seal member and the sliding rod.

The seal 5 is provided with axially extending side wall 11 which embraces the end portion of the conduit 3. Serrations 9 on the inner surface of the side wall 11 are adapted to cooperate with corresponding serrations 8 on the conduit 3 to secure the seal member 5 to the conduit 3. The end portion of the seal 5 which overlies the flange 7 on the collar 4 restrains the flange 7 against axial movement and holds the flange 7 securely against the end portion of the conduit 3.

FIG. 2 shows another embodiment of the present invention. The seal assembly 10 is similar to the seal assembly 1 shown in FIG. 1 but incorporates the redundant seal feature of the present invention. An annular lip 19 is formed integrally with the seal member 15 and extends outwardly beyond the collar 16 into engagement with the rod 12. The lip 19 exerts sufficient pressure on the rod 12 to prevent liquid from leaking past the lip to the point of contact between the axial portion of the collar 14 and the rod 12. The pressure exerted by the lip 19 on the rod 12 is not sufficient to significantly interfere with the rod 12 sliding in the conduit 13. The redundant seal feature provided by the lip 19 results in a highly leak-resistant seal assembly 10. The seal assembly 5 of the present invention shown in FIG. 1 is very leak resistant and would prove adequate under most circumstances. However, in those instances where the cable rod assembly will be used in an environment which contains liquids that are highly damaging to the rod assembly, such as salt water, the seal assembly 10 shown in FIG. 2 may be preferred.

In addition to performing the redundant seal function, the lip 19 performs a cleaning function by scraping undesirable liquids and debris from the rod 12 as the rod 12 slides past the lip 19 into the conduit 13. This prevents debris from lodging in the contact area between the collar 16 and rod 12. This also prevents potentially damaging liquids from remaining on the rod 12 for any substantial length of time.

The seal assembly 20 in FIG. 3 shows another embodiment of the present invention. The assembly 25 is similar to the seal assembly 5 in FIG. 1, but includes a tapered lip 28 connected to the outward end of the axial portion 26 of the collar 24. The radially inward surface of the lip 28 remains in close contact with the rod 22 in much the same manner as the axial portion 6 of the collar 4 in FIG. 1. In addition, the seal 25 exerts a compressive force on the lip 28 to effect self-adjustment of the lip 28 in much the same way that the seal 5 in FIG. 1 exerted a compressive force on the axial portion 6 of the collar 4 to effect self-adjustment of the axial portion 6.

The lip 28 prevents a substantial part of the axial portion 26 of the collar 24 from coming in contact with the rod 22. This reduces the friction between the sealing assembly 20 and the rod 22. The collar 24 is less susceptible to frictional wear caused by the sliding rod 22 and offers less interference to the passage of the sliding rod 22 past the sealing member 20.

By tapering the radially inward surface of the lip 28, as shown in FIG. 3, improved sealing and self-adjustment properties result. As the rod 22 is displacedly received by the conduit 23, the tapered shape of the lip 28 causes a radially inward force to be exerted on the lip 28 by the sliding rod 22. This force combines with the force exerted by the seal 25 on the lip 28 to effect a tight seal around the rod 22. When the rod 22 is displacedly withdrawn from the conduit 23, the taper of the lip 28 causes a radially outward force to be exerted on the lip 28. The rod 22 slides easily past the lip 28.

The embodiment of the seal assembly 30 shown in FIG. 4 is similar to the seal assembly 20 shown in FIG. 3 in combination with a redundant seal feature similar to that shown in FIG. 2. In addition, the tapered lip 28 shown in FIG. 3 has been replaced by a straight lip 37. The straight lip 37 performs in a manner similar to the lip 28 in FIG. 3.

While the invention has been described with reference to a specific embodiment, the exact nature and scope of the invention is defined in the following claims.

What is claimed is:

1. A self-adjusting cable rod seal adapted to be mounted on a cable conduit having a cable rod slidably positioned therein comprising a bearing collar having a long axial portion disposed in close clearance around the rod and terminating inwardly in a radially extending flange, and a resilient seal having an end wall overlying said flange and axially restrained to hold the flange against the end portion of the conduit, said wall having an axial bore radially compressing the axial portion of the collar disposed therein toward the rod.

2. The apparatus of claim 1 wherein the resilient seal embraces the end portion of the conduit.

3. The apparatus of claim 1 wherein the axial portion of the bearing collar is continuously disposed in close clearance around the rod.

4. The apparatus of claim 1 wherein the collar is formed of a thermoplastic polymeric material.

5. The apparatus of claim 1 wherein the seal is formed of an elastomeric material.

6. The apparatus of claim 1 wheren the seal is formed of an elastomeric material and the collar is formed of a thermoplastic polymeric material.

7. The apparatus of claim 1 further comprising an annular lip on the resilient seal which extends outwardly at an angle beyond the collar and terminates in touching relationship with the rod.

8. The apparatus of claim 2 wherein the resilient seal is provided with a sidewall having serrations adapted to cooperate with corresponding serrations on the end portion of the conduit for securing the seal to the conduit.

9. The apparatus of claim 4 wherein the collar is formed of polyethylene.

10. The apparatus of claim 6 wherein the collar is formed of polyethylene.

11. The apparatus of claim 7 wherein the annular lip is formed integrally with the seal.

12. A self-adjusting cable rod seal adapted to be mounted on a cable conduit having a cable rod slidably positioned therein comprising a bearing collar having a long axial portion terminating axially inwardly in a radially outwardly extending flange and terminating axially outwardly in a relatively small radially-inwardly projecting lip disposed in close clearance around the rod, and a resilient seal having an end wall overlying said flange and axially restrained to hold the flange against the end portion of the conduit, said wall having an axial bore radially compressing the axial portions and lip portions of the collar disposed therein toward the rod.

13. The apparatus of claim 12 wherein the lip is radially internally tapered with its axially outward end of larger diameter than its axially inward end.

14. The apparatus of claim 12 further comprising an annular lip on the resilient seal which extends axially outwardly at an angle beyond the collar and terminates in touching relationship with the rod.

15. The apparatus of claim 12 wherein the resilient seal embraces the end portion of the conduit.

16. The apparatus of claim 12 wherein the lip portion of the bearing collar is continuously disposed in close clearance around the rod.

17. The apparatus of claim 12 wherein the seal is formed of an elastomeric material and the collar is formed of a thermoplastic polymeric material.

18. The apparatus of claim 15 wherein the resilient seal is provided with a sidewall having serrations adapted to cooperate with corresponding serrations on the end portion of the conduit for securing the seal to the conduit.

19. The apparatus of claim 14 wherein the annular lip on the seal is formed integrally with the seal.

20. A self adjusting cable rod seal adapted to be mounted on a cable conduit having a cable rod slidably positioned therein comprising a bearing collar having a long axial portion disposed in close clearance around the rod and terminating inwardly in a radially extending flange, and a resilient seal having an end wall overlying said flange and axially restrained to prevent axial movement of the flange, said wall having an axial bore radially compressing the axial portion of the collar disposed therein toward the rod.

21. A self adjusting cable rod seal adapted to be mounted on a cable conduit having a cable rod slidably positioned therein comprising a bearing collar having a long axial portion terminating axially inwardly in a radially outwardly extending flange and terminating axially outwardly in a relatively small radially inwardly projecting lip disposed in close clearance around the rod, and a resilient seal having an end wall overlying said flange and axially restrained to prevent axial movement of flange, said wall having an axial bore radially compressing the axial portions and lip portions of the collar disposed therein toward the rod.

* * * * *